Oct. 8, 1946.                C. A. DIES                2,409,023
            METHOD OF MAKING RETURN BEND PIPE COUPLINGS
                       Filed May 10, 1943
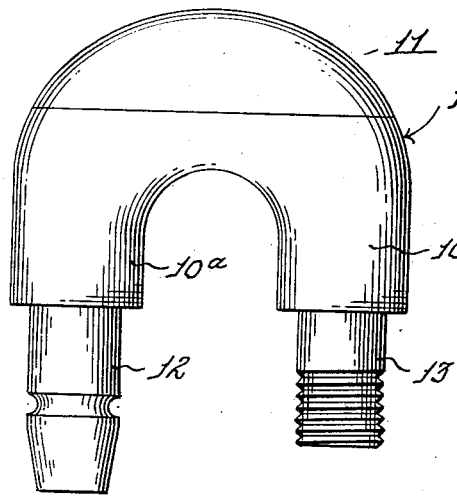
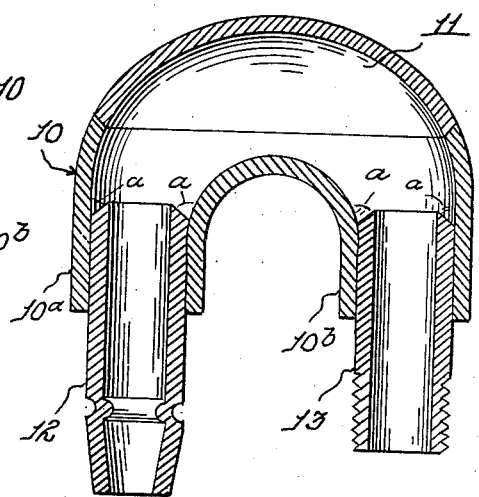
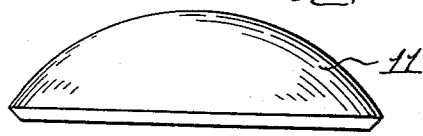
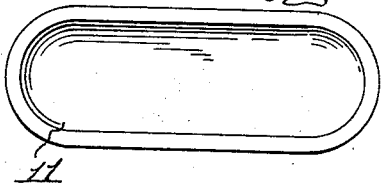
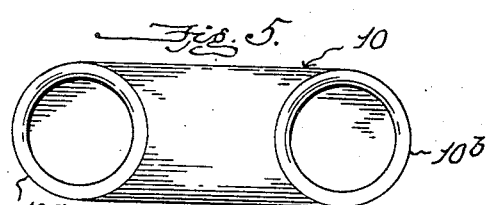
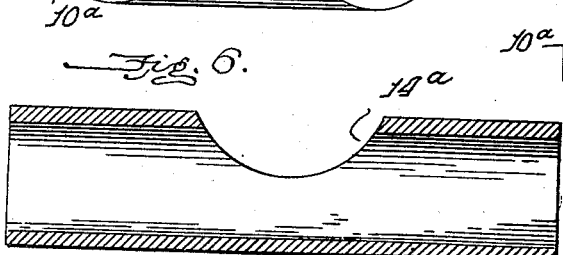
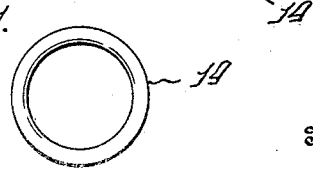
Inventor:
Charles A. Dies.

Patented Oct. 8, 1946

2,409,023

UNITED STATES PATENT OFFICE 2,409,023

METHOD OF MAKING RETURN BEND PIPE COUPLINGS

Charles A. Dies, Chicago, Ill.

Application May 10, 1943, Serial No. 486,352

1 Claim. (Cl. 29—157.6.)

This invention relates to the general class of pipe fittings, with particular reference to fittings or couplings of that type used in connection with steam radiators and the coils of steam boilers.

The principal object of my invention is to provide a coupling or return bend of this general character constructed of wrought iron and formed in such manner that it can be produced economically and expeditiously either manually or by machine, and therefore contemplates not only the peculiar construction of the article but also the method of making the same.

A further object of my invention is to provide a return bend coupling for the coils of steam boilers or steam radiators in which the parts constituting the coupling permit the pipes connected thereto in constructing the coil or radiator to be welded to the coupling at the inner ends of the pipes and thus insure rigid connections or sealed joints between the coupling and pipes.

With these principal objects in view my invention comprises a return bend or arcuate coupling made up of a length of wrought iron pipe bent to form a U-shaped body portion open at the curved end thereof for access to the inner ends of the spaced apart members for the welding operation, in connection with a cap or cover closing the opening—the body portion being shaped by bending the pipe over a mandrel.

In the following specification I have fully described the particular construction of the article, as well as the method of making the same, and what I claim as new and desire to protect by Letters Patent is more specifically set forth in the appended claim.

In the drawing:

Fig. 1 is a side elevation of my improved form of return bend for superheated-steam coils, including short pipe sections for convenience in connecting lengths of pipe thereto in constructing a coil or radiator.

Fig. 2 is a vertical sectional view through the same.

Figs. 3 and 4 are detail views of the cover or cap forming a part of the coupling.

Fig. 5 is an end view of the coupling.

Fig. 6 is a sectional view of the blank or pipe from which the body portion of the coupling is formed.

Fig. 7 is an end view of said blank, and

Fig. 8 is a view illustrating the manner of shaping the body portion over a mandrel.

In carrying out my invention the U-shaped return bend is made up of two parts 10 and 11 to receive the lengths of pipes in the construction of a steam coil or steam radiator—short pipes 12 and 13, as illustrated in the drawing, being preferably included in the construction of the coupling for the more convenient attachment of the pipes of the steam coil or radiator. The part or body portion 10 includes members 10a, 10b—to which the pipes are connected as hereinafter described—while the part 11 forms the added top or closing cap, whereby the body portion is provided with an opening at its curved end or connecting portion so that the pipes can be welded thereto at their inner ends, at a, and the subsequent welding of the top to the body portion over the opening completes the coupling.

Although the coupling may be furnished to the trade with the body portion and cap, I prefer to include the short pipes illustrated in the drawing for the more convenient construction of coils or radiators, and these short pipes may be provided at their outer ends with standard threads (pipe 12) or with tapered ends (pipe 13), the latter contemplating attachment of pipes in the manner shown and described in my companion application for patent for pipe coupling filed March 27, 1943, Serial No. 480,811.

As will be obvious a return bend coupling in accordance with my invention not only facilitates the construction of a coil or radiator but also insures rigid sealed joints at the coupling, adapting it especially for use in connection with steam coils for conducting superheated steam.

An important part of my invention is the method of making the coupling—by either hand or machine—and consists in forming the body portion or part 10 of a length of wrought iron pipe, 14, having an intermediate portion thereof cut out at one side in the form of a semi-circular recess 14a, and this pipe is bent upon itself over a mandrel 15—in the form of a round bar—so that the recess will provide the open end and the portions of the pipe at opposite sides thereof will provide the members to which the short pipe sections 12 and 13 are welded as hereinbefore explained. In connection with this body portion the concavo-convex metal cap or cover 11 is employed, to be welded in place after the pipe sections are attached, and for convenience in fitting the cap, as well as for welding the same to the body portion, the contiguous edges of the cap and opening in the body portion are beveled. Likewise, for welding the pipe sections to the coupling the inner ends of said pipe sections are beveled, and apparently the opening in the body portion provides access for this welding operation. The size of the coupling will of course depend on the size of the pipe employed in forming the body portion thereof, and the cap or cover will be of a size to fit the opening formed after the pipe is bent, and it may be expedient to use the portion cut from the pipe in forming the cap or cover, as by swaging said cut out portion—it being understood that the size of the recess or opening in the pipe is increased when the pipe is bent over the mandrel.

From the foregoing description, in connection with the accompanying drawing, it will be obvious that my invention provides a simple and economical means for making return bend couplings, possessing important advantages in construction, method of production and use as compared with ordinary couplings of this kind.

I claim:

The method of making a return bend pipe coupling for radiators and coils for steam boilers which consists in cutting away a small portion at one side of a short length of pipe to provide an arcuate opening, bending the pipe at the center of the opening to form the side members and connecting portion of the return bend with the aforementioned arcuate opening in the upper part of the connecting portion, and attaching short lengths of pipe—with pipe connecting means at their outer ends—to the outer ends of the side members by inserting the short lengths of pipe into the outer ends of the side members and welding them thereto at their inner ends through the aforementioned opening in the connecting portion of the return bend, and finally welding a cap over said opening.

CHARLES A. DIES.